United States Patent [19]

Limanowski et al.

[11] Patent Number: 4,755,153
[45] Date of Patent: * Jul. 5, 1988

[54] CAPACITOR COVER FOR CG TYPE CAPACITOR

[75] Inventors: Josef K. Limanowski, Huntsville, Ala.; Thomas L. Arnold, Carmel, Ind.; C. Wayne Hodges, Huntsville, Ala.

[73] Assignee: 501 Electrolytics, Inc., Del.

[*] Notice: The portion of the term of this patent subsequent to Dec. 23, 2003 has been disclaimed.

[21] Appl. No.: 33,872

[22] Filed: Apr. 2, 1987

Related U.S. Application Data

[63] Continuation of Ser. No. 867,946, May 29, 1986, abandoned.

[51] Int. Cl.$^4$ ........................................... H01R 13/415
[52] U.S. Cl. ..................................... 439/741; 439/870
[58] Field of Search ............... 439/84, 271, 272, 273, 439/685, 733, 741, 742, 743, 870, 559

[56] References Cited

U.S. PATENT DOCUMENTS

| | | | |
|---|---|---|---|
| 1,902,236 | 3/1933 | Heintz | 339/215 |
| 2,443,545 | 6/1948 | Schwennesen | 339/94 A |
| 3,562,700 | 2/1971 | Miller | 339/220 R |
| 4,047,790 | 9/1977 | Carino | 339/220 C |
| 4,631,631 | 12/1986 | Hodges et al. | 361/306 |

FOREIGN PATENT DOCUMENTS

| | | | |
|---|---|---|---|
| 2403131 | 7/1975 | Fed. Rep. of Germany | 339/214 R |
| 956696 | 4/1964 | United Kingdom | 339/220 |

Primary Examiner—Gil Weidenfeld
Assistant Examiner—Gary F. Paumen

[57] ABSTRACT

An internally threaded insert having a knurled outer surface is positioned in an aperture formed in a cover for a capacitor. This provides an antitwist characteristic between the insert and the walls of the aperture to facilitate a seal between the two. An electrical terminal can then be threaded into the insert to electrically connect it to an internal lead of the capacitor. A bushing is also carried in the aperture to provide a seal between the insert and the cover. The insert has a tenon which includes a shoulder providing large and small diameters. The large diameter tenon is deformed to provide a washer and seal at and around the insert at the aperture. After placement of the internal capacitor lead over the formed washer around the insert, the smaller diameter tenon is deformed to provide a rivet head over the lead to hold it in place.

7 Claims, 2 Drawing Sheets

CAPACITOR COVER FOR CG TYPE CAPACITOR

This application is a continuation of application Ser. No. 867,946, filed May 29, 1986, now abandoned.

BACKGROUND OF THE INVENTION

Electrolytic capacitors commonly use plastic discs as the end closures or covers for the capacitor. Such material serves as a good electrical insulator for the electrical leads running from the capacitor. Electrical contact between an internal lead of the capacitor and an outside terminal is normally made through a rivet connection, the rivet extending through an aperture in the closing. This arrangement causes difficulty in securing a tight, secure fit between the rivet and the plastic closure. Such difficulty causes the electrical path between the terminal and the electrical leads to be broken down, thereby increasing the electrical resistance of the system.

OBJECTS OF FEATURES OF THE INVENTION

The present invention is concerned with the provision of a novel means to secure an electrical-mechanical connection for electrical leads to a plastic capacitor end closure or cover and has as one of its objects the provision of such a connecting means that has a more reliable connection.

Another object of the invention is to provide a good electrical connection between an electrical terminal and an internal lead of an electrolytic capacitor having a plastic end closure or cover.

A further object of the invention is to provide a method of providing such an electrical connection that is simple, effective, and relatively inexpensive.

SUMMARY OF THE INVENTION

Accordingly, there is provided a cover and terminal connection for a capacitor which comprises a disc fabricated of an electrically insulative material, at least one aperture in the disc, a metal insert extending through the aperture and having a knurled face adapted to engage the aperture to thereby provide an antitwist characteristic between the disc and the insert, a flange extending from and around the metal insert engaging the disc at the aperture to provide a washer and a seal with the disc, receiving means within the insert adapted to receive an electrical terminal, and retaining means holding an internal electrical lead into electrical contact with the metal insert.

DETAILED DESCRIPTION OF THE INVENTION

Figure 1:
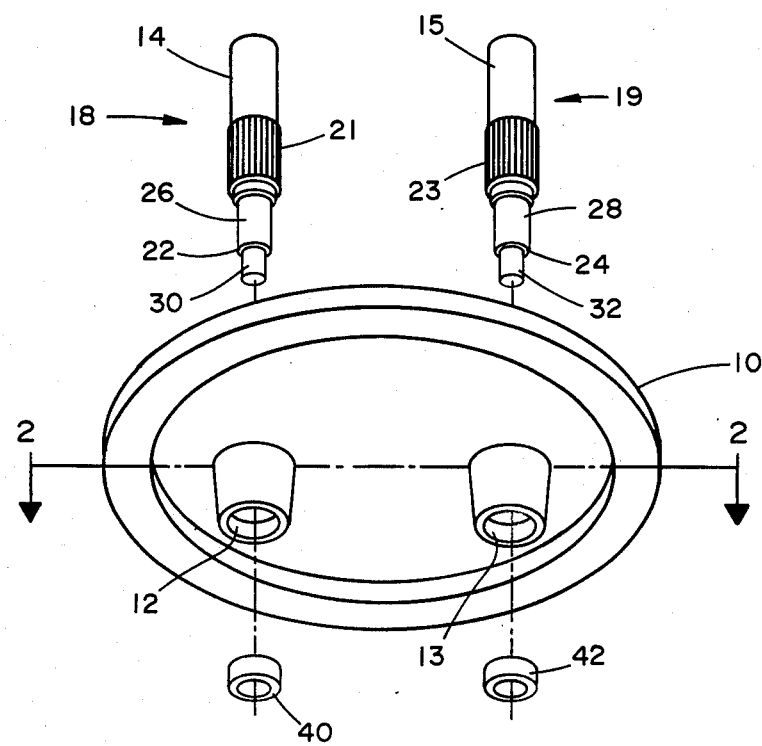
FIG. 1 is an exploded view of a terminal connection means for a capacitor showing the features of the invention.

Referring to the drawings, a typical prior art electrolytic capacitor employs an end closure or cover comprising a relatively flat disc 10 fabricated of an electrically insulative material such as plastic to seal the capacitor body. A pair of apertures 12 and 13 are provided in the disc through which suitable electrical terminals can be connected to internal electrical leads of the capacitor. In this type of construction it is very difficult to achieve a good mechanical connection between the capacitor's internal electrical leads 16 and 17 (FIGS. 3 and 4) and electrical terminals 18 and 19 due to the inability to achieve a snug fit between the electrical terminals and the apertures 12 and 13 of the plastic disc 10. Such a fit is needed in order to insure that the electrical path from the internal lead 16 and 17 to the terminals 18 and 19 will be unbroken.

In accordance with the present invention, metal inserts 14 and 15 provide an antitwisting characteristic between the disc and the insert. More specifically, inserts 14 and 15 include an outer face having knurled portions 21 and 23 which are adapted to mate the walls of the apertures 12 and 13. The inserts also include tenons 18 and 19 which include shoulders 22 and 24. The shoulders provide tenons 26 and 28 of one diameter and tenons 30 and 32 of a smaller diameter.

Silicone bushings 40 and 42 extend into apertures 12 and 13 to provide a good seal for inserts 14 and 15. Other suitable materials for the bushing would be an electrically insulative material such as a thermal plastic or a thermal set material such as nylon.

Figure 2:
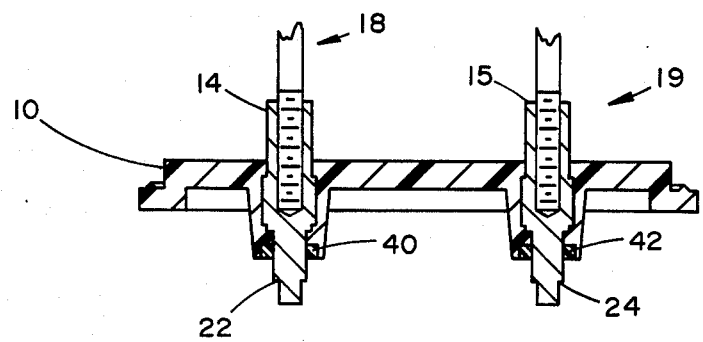
FIG. 2 is a view taken along the line 2—2 of FIG. 1.
Figure 3:
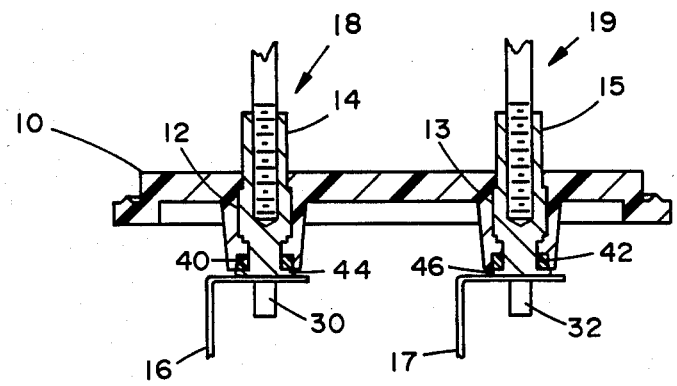
FIGS. 3 and 4 are views taken along the lines 2—2 of FIG. 1 with internal capacitor leads in place.
Figure 4:
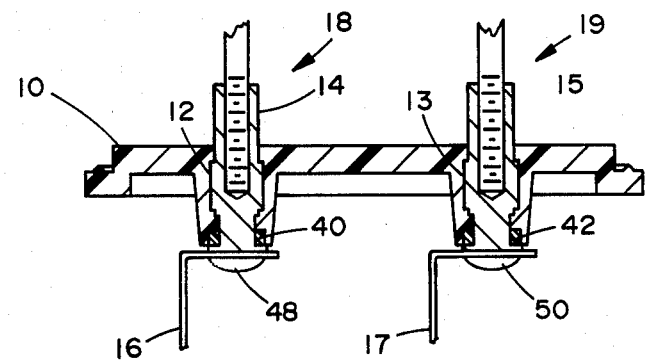

Referring now to FIGS. 2–4, the method of assembling the terminal connection into the cover can be described. In FIG. 2, inserts 14 and 15 have been forced into apertures 12 and 13 as well as bushings 40 and 42. In FIGS. 2 and 3, large diameter tenons 26 and 28 have been deformed and flattened against disc 10 through shoulders 22 and 24 to provide washers 44 and 46 that are integral with the inserts 14 and 15 and which provide a seal between the inserts and disc 10. The tenons could be flattened through a commonly known orbital riveting process, for example. In FIGS. 3 and 4 internal leads 16 and 17 have been positioned on washers 44 and 46 around smaller diameter tenons 30 and 32. The smaller diameter tenons are then deformed through orbital riveting to provide rivets 48 and 50 which hold the internal leads in place.

Electrical terminals 18 and 19 can then be threaded into inserts 14 and 15.

What is claimed is:

1. A method of providing a capacitor cover and an electrical connector electrically connecting at least one electrical terminal to at least one internal lead of the capacitor, said method comprising the steps of:
    (a) providing a disc of electrically insulative material and having at least one aperture therein,
    (b) providing an insert to be inserted in said aperture, said insert being comprised of a knurled portion, a tenon extending therefrom, and receiving means adapted to receive said electrical terminal, said tenon having a shoulder to provide first and second diameter tenons,
    (c) forcing said knurled portion into said aperture such that an anti-twist characteristic is developed between said insert and said disc,
    (d) deforming said first diameter tenon to flatten same against said disc to provide a washer and a seal between said disc and said tenon, and
    (e) positioning said internal lead on said washer and deforming said second diameter tenon against said internal lead to hold same in place.

2. A method according to claim 1 wherein said knurled portion is forced into said aperture through pressure.

3. A method according to claim 1 wherein said first diameter tenon is flattened by orbital riveting.

4. A method according to claim 1 wherein said second diameter tenon is deformed by orbital riveting.

5. A method according to claim 1 and further comprising the steps of providing an electrically insulative bushing, and locating said bushing in surrounding relation to said first diameter tenon and in engagement with said disc, wherein said bushing is captured between said washer and said disc when said first diameter tenon is deformed.

6. A method according to claim 5 and further comprising the step of forcing said knurled portion into at least a portion of said bushing.

7. A method of providing a capacitor cover and an electrical connector electrically connecting at least one electrical terminal to at least one internal lead of the capacitor, said method comprising the steps of:
  (a) providing a disc of electrically insulative material having therein at least one aperture,
  (b) providing an insert to be inserted in said aperture, said insert including a knurled portion, a tenon extending therefrom and having a shoulder to provide first and second diameter tenons, and reciving means adapted to receive said electrical terminal,
  (c) forcing said knurled portion into said aperture such that an anti-twist characteristic is developed between said insert and said disc,
  (d) providing an electrically insulative bushing and locating said bushing in surrounding relation to said first diameter tenon and in engagement with said disc,
  (e) deforming said first diameter tenon to flatten same against said disc to provide a washer and a seal between said disc and said tenon and to capture said bushing between said washer and said disc, and
  (f) positioning said internal lead on said washer and deforming said second diameter tenon against said internal lead to hold same in place.

* * * * *